UNITED STATES PATENT OFFICE 2,622,070

PROCESS FOR INHIBITING FOAM

Louis T. Monson, Alhambra, Calif., assignor to Petrolite Corporation, a corporation of Delaware No Drawing. Application September 19, 1947, Serial No. 775,145

6 Claims. (Cl. 252—321)

This invention relates to a process for reducing or destroying foam or inhibiting its formation, in compositions of either aqueous or non-aqueous nature.

Foams occur as undesirable, incidental features in many industrial processes. The theory of their formation is not highly developed; so that hypotheses on which foam reduction or destruction processes might be based are difficult to formulate. As a consequence, foam-destroying agents are usually devised for use in the case of particular foams and are not applicable broadly to foam problems.

I have discovered a novel process of reducing or destroying foams and of preventing their formation, which appears to be relatively general in applicability, in that it may be used on compositions comprising aqueous materials or solutions; on compositions comprising non-aqueous materials, such as hydrocarbon liquids; and on compositions comprising mixtures of aqueous and non-aqueous media. My process consists in subjecting a foaming or potentially-foaming composition to the action of a small proportion of a reagent or anti-foamer of the kind subsequently described, thereby causing the foaming properties of the liquid to be diminished, suppressed or destroyed. In applying my process to the reduction or destruction of a foam, the reagent is poured or sprayed or dripped into the body of foam on top the liquid, as desired; and the foam breaks and is destroyed or reduced, substantially at once, as a consequence of such addition of said reagent. In applying my process to the prevention of foaming, the reagent is admixed, in some predetermined small proportion, with a potentially-foaming liquid, by any desired or suitable procedure. The ability of the system to foam is destroyed or at least materially reduced by such addition of said reagent.

Reference is made to my U. S. Patent No. 2,408,527, issued October 1, 1946. Said patent discloses and claims, for use in a process for reducing or preventing foam, a reagent comprising a basic acylated polyaminoalcohol of a recited type.

The reagents employed in the present process consist of binary mixtures of certain basic acylated polyaminoalcohols with either a blown fatty body or a sulfonated fatty body, or ternary mixtures containing all three of said ingredients. Each of these three types of ingredients will be discussed in detail below, and specific examples of each type will be given, as well as examples of the binary and ternary mixtures which constitute my finished reagent for the present purpose. Such examples will illustrate what appears to be a generally useful process for destroying, reducing or suppressing foam, at quite nominal cost and with great simplicity of operation.

One class of ingredients required to produce the reagents employed in the present process consists of basic acylated polyaminoalcohols in which an acyloxy radical, derived from a detergent-forming acid having from 8 to 32 carbon atoms, is joined to a basic nitrogen atom by a carbon atom chain, or a carbon atom chain which is interrupted at least once by an oxygen atom. The aminoalcohols have more than one amino radical, for that matter, more than one basic amino radical. The compounds herein included as components of the reagents employed as anti-foamers are well known compounds and are produced by conventional procedures. Stated another way, these ingredients of my reagents are esters of aminoalcohols which contain ether linkages, as well as more than one amino nitrogen atom.

The phrase "basic amino nitrogen atom" is used in its conventional sense. ("Unsaturated groups, or negative groups, if substituted for one or more of the hydrogens of ammonia, reduce the basicity of the nitrogen atom to a remarkable degree. In general, the presence of one negative group linked on the nitrogen is sufficient to destroy the ordinary basic properties." Textbook of Organic Chemistry, Richter, second edition, page 253.)

Reference to an amine and the subsequent amino compounds is intended to include the salts and the anhydro base, as well as the hydrated base. Both the anhydro base and the hydrated base are obviously present when an aqueous system is being subjected to the reagent or when the reagent is used as a water solution or dispersion. ("In an aqueous solution of the amine, the anhydro base, R—NH$_2$, the hydrated base, $$R—NH_3—OH$$

and the two ions are all present." Richter, s. v., page 252.)

These ingredients of my reagents are obtained from monocarboxylic organic detergent-forming acids, by reaction with certain amines.

A description of certain high molal monocarboxy acids, and more particularly those commonly referred to as detergent-forming monocarboxy acids, appears in U. S. Patent No. 2,324,490. For convenience, the following description is substantially a verbatim form of the same subject-matter as it appears in said patent.

"It is well known that certain monocarboxy organic acids containing eight carbon atoms or more, and not more than 32 carbon atoms, are characterized by the fact that they combine with alkali to produce soap or soap-like materials. These detergent-forming acids include fatty acids, resin acids, petroleum acids, etc. For the sake of convenience, these acids will be indicated by the formula R.COOH. Certain derivatives of detergent-forming acids react with alkali to produce soap or soap-like materials, and are the obvious equivalent of the unchanged or unmodified detergent-forming acids. For instance, instead of fatty acids one might employ the chlorinated fatty acids. Instead of the resin acids, one might employ the hydrogenated resin acids. Instead of naphthenic acids, one might employ brominated naphthenic acids, etc.

"The fatty acids are of the type commonly referred to as higher fatty acids; and of course, this is also true in regard to derivatives of the kind indicated, insofar that such derivatives are obtained from higher fatty acids. The petroleum acids include not only naturally-occurring naphthenic acids, but also acids obtained by the oxidation of wax, paraffin, etc. Such acids may have as many as 32 carbon atoms. For instance, see U. S. Patent No. 2,242,837, dated May 20, 1941, to Shields."

I have found that this class of ingredient of my reagent is preferably derived from unsaturated fatty acids having 18 carbon atoms. Such unsaturated fatty acids include oleic acid, ricinoleic acid, linoleic acid, linolenic acid, etc. One may employ mixed fatty acids, as, for example, the fatty acids obtained from hydrolysis of cottonseed oil, soyabean oil, etc. My preferred antifoamer ingredient of this type is obtained from unsaturated fatty acids, and more especially, unsaturated fatty acids containing a hydroxyl radical, or unsaturated fatty acids which have been subjected to oxidation. In addition to synthetic carboxy acids obtained by the oxidation of paraffins or the like, there is the somewhat analogous class obtained by treating carbon dioxide or carbon monoxide, in the presence of hydrogen or an olefin, with steam, or by casuing a halogenated hydrocarbon to act with potassium cyanide and saponifying the product obtained. Such products or mixtures thereof, having at least 8 and not more than 32 carbon atoms and having at least one carboxyl group, or the equivalent thereof, are suitable as detergent-forming monocarboxy acids; and another analogous class equally suitable is the mixture of carboxylic acids obtained by the alkali treatment of alcohols of higher molecular weight formed in the catalytic hydrogenation of carbon monoxide.

As is well known, one need not use the high molal carboxy acid, such as a fatty acid, for introduction of the acyl group or acyloxy group. Any suitable functional equivalent such as the acyl halide, the anhydride, ester, amide, etc., may be employed.

The anti-foaming agent employed in the present process includes a basic polyaminoalcohol ester, as described. Aminoalcohol esters of the kind herein contemplated are described in U. S. Patent No. 2,259,704, dated October 21, 1941, to Monson and Anderson.

In light of what has been said, it hardly appears necessary to include a list of reactants and reagents derivable therefrom. Since the basic polyaminoalcohol from which this type of ingredient of my reagents is derived, by the replacement of one hydroxyl hydrogen atom with the acyl radical of a monocarboxy detergent-forming acid, is essentially a polymerized triethanolamine, triethanolamine itself is commonly the amino raw material employed. However, if desired, polymerized triethanolamine may be first prepared and later subjected to the acylation step. In the first instance, polymerization of the triethanolamine proceeds simultaneously with acylation. In the second instance, the two operations are conducted separately. Triethanolamine is readily polymerized, simply by heating, although it may be preferred, in some instances, to conduct the polymerization in the presence of suitable catalysts, such as minor proportions of sodium hydroxide or iron.

Some of the acylated amino bodies suitable for use as ingredients of the reagents employed in my process are freely dispersible in water in the free state. Presumably, such systems comprise the reagent in the form of a base, i. e., a substituted ammonium compound. In other instances, the free forms of the reagents are substantially water-insoluble, but the salt forms (e. g., the acetates) are very water-dispersible. In some such instances, therefore, it is very much more desirable to employ this ingredient of the reagent in the form of one of its salts. I have found, for example, that the acetate, hydroxyacetate, lactate, gluconate, propionate, caprate, phthalate, fumarate, maleate, benzoate, succinate, oxalate, tartrate, chloride, nitrate, or sulfate, prepared by addition of the suitable acid to the acylated amino body, constitutes a reagent which is usually somewhat more soluble or dispersible in water than the original acylated amino body, and which is, if anything, slightly more effective than the simple acylated amino body, when used to prepare the reagent employed in my process. In such instances where the simple acylated amino body is not particularly water-dispersible, it may still be possible to employ it in free form and without preparing a salt form, by using some non-aqueous solvent, such as aromatic petroleum solvent, instead of water. It is to be understood that references to the reagents in these specifications and claims include the amino bodies in basic form and in the form of salts of acids, as well as the amino bodies themselves.

As an example of a preferred type of ingredient of this character, suitable for use in preparing a reagent which is effective for use in my process, the following is submitted: I prepare a mixture of diamino and triamino materials which correspond essentially to either one of the two following type formulas:

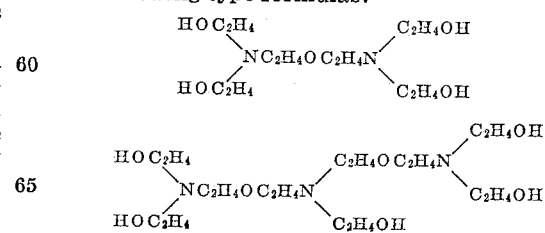

As stated above, triethanolamine may be polymerized to produce the polyaminalcohol which is subsequently to be acylated. It is apparent from an inspection of the above formulas that they represent dimeric and trimeric polymerized forms of triethanolamine. It has also been stated above that triethanolamine may be polymerized simply by heating. After determining the average molecular weight of such mixture, I combine the same with castor oil in the proportion of 1 pound mole of castor oil for 3 pound moles of the mixed amines, "pound mole" in the latter case being calculated on the average molecular weight as determined. Such mixture is heated to approximately 160–260° C. for approximately 6 to 25 hours, until reaction is complete. Progress of the reaction may be followed by the disappearance of triricinolein, which is the major and principal component of the castor oil. If triethanolamine itself is employed as the amino raw material, as it is stated above that it may be, it is evident that, instead of proceeding as just stated, the final acylated product is obtained by heating together one pound mole of castor oil and either 6 or 9 pound moles of triethanolamine, depending on whether it is desired to produce an acylated derivative of the aminoalcohol shown in the first or the second formula above.

In summary, attention is directed to the fact that the amino compounds herein specified are polyamino in type. They have free hydroxyl radicals present. There must be present one occurrence of the radical RCO which is the acyl radical of a monocarboxy detergent-forming acid having at least 8 and not more than 32 carbon atoms, and the amino nitrogen atoms must be basic, i. e., free from direct linkage with an unsaturated or negative radical such as an acyl radical or an aryl radical.

I incorporate an acylated amino body of the above described class in all the reagents employed in the present process. With such amino ingredient, I mix one or more members of either or both of two other classes of ingredients, viz., blown fatty bodies and sulfonated fatty bodies. One class of my reagents therefore comprises a mixture of amino body and blown fatty body. Another comprises a mixture of amino body and sulfonated fatty body. A third comprises a mixture of amino body, blown fatty body, and sulfonated fatty body. I shall next describe the blown fatty bodies which are useful as ingredients in my reagents.

Blown fatty oils, and particularly blown castor oil, have long been known and have been used in various arts, including the demulsification of petroleum oils. In general, they are produced by the action on a fatty oil or fatty acid of an oxygen-containing gas, commonly air, and usually at somewhat elevated temperatures. In characteristics, they range from relatively low viscosity, light colored liquids to nearly black liquids whose consistency may best be defined as semi-livery. I prefer to use blown castor oil as the preferred ingredient of this type in my reagent.

It has long been known that various animal, vegetable, and marine oils can be blown or oxidized, so as to yield materials which differ in chemical and physical properties and characteristics from the parent materials from which they were derived. The oxidation process is generally conducted by means of moist or dry air, ozone, ozonized air, or a mixture of the same. It may be conducted at atmospheric pressure, or may be conducted under increased pressures of several atmospheres or more. Oxidation may be conducted at relatively low temperatures, for instance, 100° C., or 130° C., or may be conducted at a much higher temperature. Oxidation may be conducted in absence of catalysts, or in presence of catalysts. Such catalysts may consist of metallic salts, such as cobalt or manganese oleate, or may consist of organic material, such as alpha pinene or the like. Oxidation may be conducted in a relatively short time, such as 20 hours, or may require 200 hours or more.

Patents which describe conventional blown oils or conventional methods of making various blown oils for various purposes (including in some instances, for the purpose of demulsifying crude oils), include the following:

U. S. Patent No. 1,929,399, dated October 3, 1933, to Fuchs; U. S. Patent No. 1,969,387, dated August 7, 1934, to Tumbler; U. S. Patent No. 2,023,979, dated December 10, 1935, to Stehr; U. S. Patent No. 2,041,729, dated May 26, 1936, to Seymour; and U. S. Patent No. 1,984,633, dated December 18, 1934, to De Groote and Keiser.

Insofar that the material or composition I prefer to use as a component of the reagent of my process is derived from blown castor oil, an effort will be made to describe said material or compound in considerable detail. Mild oxidation of castor oil (see "Chemical Technology and Analysis of Oils, Fats and Waxes," by Lewkowitsch, 6th edition, vol. 2, p. 406) produces relatively small modifications in certain important chemical indices, such as the iodine value, the acetyl value, and the saponification value. If drastic oxidation takes place, either by continued mild oxidation from the very beginning of the reaction, or as induced by either a higher temperature of reaction, or by the presence of a catalyst, such as alpha pinene, manganese ricinoleate, etc., then one obtains an oxidized oil having characteristics which clearly indicate that drastic oxidation has taken place. These indices of drastic oxidation are a relatively low iodine value, such as 65 or less, and may be as low as 40 or thereabouts; an acetyl value of approximately 160 to 200; an increased viscosity; a specific gravity of almost 1, or even a trifle over 1 at times; and in absence of other coloring matter, a deep orange to deep brown color.

Drastically oxidized castor oil can be prepared by well known methods, or such products can be purchased on the open market under various trade names, such as "blown castor oil," "bodied castor oil," "blended castor oil," "blended bodied castor oil," "processed castor oil," "oxidized castor oil," "heavy castor oil," "viscous castor oil," etc. These various names appear to be applied to drastically oxidized castor oils which are different in degree but not different in kind.

In preparing the reagent employed in my process, not only may blown oils be derived by direct oxidation of the various fats and oils, but also by direct oxidation of the fatty acids. Blown ricinoleic acid may be derived in the manner indicated in U. S. Patent No. 2,034,941, dated March 24, 1936, to De Groote, Keiser and Wirtel. It should be noted that blown oils in the broad generic sense herein employed include not only the products derived by oxidation, but also the products derived by polymerization. Reference is made to polymerized ricinoleic acid described in U. S. Patent No. 1,901,163, dated March 1, 1933, to Hinrichs. Reference is also made to polymerized castor oil or similar oils of the kind disclosed in co-pending application Serial No. 59,090, filed January 13, 1936, by Ivor M. Golbeth, now U. S. Patent No. 2,114,651. It might also be desirable to point out that the expression "blown oil," as herein used, contemplates blown unsaturated liquid waxes, such as blown sperm oil. It is understood that in the appended claims the expression "blown fatty oil" is used in its broad sense to include all the various materials, such as esterified blown fatty acids.

Such blown or polymerized fatty bodies may be employed as ingredients in preparing my reagents. In addition, of course, they may be employed to acylate certain amino bodies, to produce the acylated amino-ethers which constitute one ingredient in my reagent, as described elsewhere in this specification. In the latter case, if the fatty body is a blown or polymerized fatty acid, such modified fatty acid should be converted into an ester before reaction with the amine. For instance, the methyl, ethyl, propyl, glyceryl, or any other suitable ester may be prepared from blown castor oil fatty acids, by conventional esterification processes; and the ester so produced may then be reacted with the amino body to produce the finished ingredient of my mixture.

A drastically oxidized castor oil of the above kind may, for example, have approximately the following characteristics:

| | |
|---|---|
| Acid number | 13.2 to 25.0 |
| Saponification number | 230.5 to 274.0 |
| Iodine number | 43.5 to 55.0 |
| Acetyl number | 164.0 to 192.0 |
| Hydroxyl number | 188.0 to 220.0 |
| Percent unsaponifiable matter | 1.1 |
| Percent nitrogen | 0.0 |
| Percent SO₃ | 0.0 |
| Percent ash | Trace |

Another variety of drastically oxidized castor oil which I prefer to use shows the following characteristics:

| | |
|---|---|
| Acid number | 6.3 to 8.7 |
| Saponification number | 202.5 to 223.0 |
| Iodine number | 60.8 to 63.0 |
| Acetyl number | 105.3 to 108.4 |
| Hydroxyl number | 114.4 to 118.0 |
| Percent unsaponifiable matter | 1.0 to 1.2 |
| Percent nitrogen | 0.0 |
| Percent SO₃ | 0.0 |
| Percent ash | 0.0 |

It is my preference to use blown oils, rather than blown fatty acids. I particularly prefer to use blown vegetable oils, such as blown cottonseed oil, blown corn oil, blown soyabean oil, blown rapeseed oil, and especially blown castor oil. My preferred blown oil is a blown castor oil, which has been blown somwhat more drastically than indicated by the indices above recited, and which has been blown just short of the stage which produces semi-livery oils, as described in the aforementioned Stehr Patent No. 2,023,979.

Another blown oil which I have found useful in preparing my reagents is produced from a mixture of 85 parts of castor oil and 15 parts of soyabean oil. This mixture is heated at about 250° C. and is blown with air until a high viscosity is attained. For example, the viscosity of such finished blown product may be as high as 50,000 or 75,000 centipoises; and in some instances I have employed blown oils of this composition having viscosities in excess of 100,000 centipoises at room temperature, to produce my reagents.

As stated above, all my reagents incorporate a proportion of an acylated amino ingredient, as described above. Some of my reagents employ this amino constituent admixed with a blown fatty body of the character just described. Some of my reagents are mixtures of such acylated amino body and sulfonated fatty bodies; while still others include, in addition to the amino body, both blown and sulfonated fatty bodies.

The nature of the sulfonated fatty bodies which are useful in the preparation of my reagents will be next described by me. It will be noted that this class of ingredient is a well defined class of material, within which class the individual members may vary considerably in detailed characteristics although still retaining the common characteristics of the class.

The preferred sulfonated fatty body employed is obtained by the action of sulfuric acid on a fatty acid or fatty oil. It is neutral, or slightly alkaline to methyl orange indicator. It contains only small amounts of water, commonly only about 4% or less. It may contain compounds of true fatty sulfonic acids, of fatty acid sulfates, or of sulfo-aromatic fatty acids (the latter, in such cases where aromatic materials were present during sulfonation), or a mixture of these materials. These particular constituents of sulfonated fatty oils are, in the free state, dibasic acids, having a strongly acidic hydrogen atom present in an acidic sulfate or sulfonic group, as well as a weakly acidic hydrogen atom in the carboxyl group. When such compounds are neutralized to methyl orange indicator with any suitable base, like caustic soda, potassium hydroxide, ammonia, or triethanolamine, or the like, only the strongly acidic hydrogen atom is replaced. Further addition of the base results in replacing the carboxylic hydrogen atom. The salts, when these compounds are neutralized only to methyl orange, are known as acid salts. My process involves the use of a mixture containing a sulfonated fatty acid or sulfonated fatty oil, which preferably comprises solely such acid salts, in contradistinction to neutral salts, except to the extent that there might be a relatively slight over-neutralization. Sometimes the acid salts of these compounds decompose in time, when neutralized with ammonia, so that they may exhibit some acidity to methyl orange. This does not destroy the utility of the material as an ingredient in the reagent of my process but the acidity exhibited may result in an unfavorable corrosive action on metal surfaces with which the reagent comes in contact. The sulfonated fatty acid or the sulfonated fatty oil will also contain non-sulfo fatty materials as is well understood in the art. The percentage of sulfur-containing acidic materials in sulfonated fatty bodies varies widely. I prefer to employ only those sulfonated fatty bodies that contain a minor proportion of sulfur-containing acidic materials, the sulfonated fatty ingredient of my reagent usually producing at best, only a poor water dispersion when tested in absence of the other ingredients of the reagent. Organically combined sulfur trioxide preferably does not exceed 6% of the sulfonated fatty matter on an anhydrous or active matter basis.

The production of sulfonated fatty bodies has been practised commercially for about 100 years. It is therefore unnecessary here to recite in detail any procedure for obtaining such products. In general outline, this procedure involves subjecting the fatty oil or fatty acid to the action of strong sulfuric acid for any desired length of time and at any desired temperature; washing the resulting acid mass with water or with aqueous solutions of salts, such as sodium chloride; and neutralizing the washed sulfonated fatty mass with a suitable base, either inorganic or organic, to any desired level of neutralization. Neutralization is commonly carried to the point where no free mineral or sulfo-acid remains, because such free strong acids promote hydrolysis and decomposition of the product. As above stated, I prefer to employ a sulfonated fatty body neutralized to, or slightly beyond, the methyl orange end-point. In such products, the strong mineral and sulfo-acids have been neutralized; but the weak carboxylic acids have not been neutralized. In other words, as stated above, such semi-neutralized sulfonated products are acid salts.

One sulfonated fatty body which I have found very useful as an ingredient in my reagents is prepared by sulfonating a mixture of 85 parts of castor oil and 15 parts of oleic acid, washing the mass, and neutralizing with ammonia until the product shows approximately 0.5 mg. of ammonia per gram, present at the carboxyl position, by titration to methyl orange end-point.

Another sulfonated fatty body I have used in preparing my reagents is made by sulfonating castor oil, washing with water, and neutralizing with sodium hydroxide approximately ⅔ of the free carboxyl group present in the resulting acidic mass. This example illustrates the fact that, while my preference generally is to use the sulfonated component less completely neutralized, as described above, it is nevertheless sometimes valuable to employ a somewhat more completely neutralized material like the present one.

Having described the three types or classes of ingredients which may be used to prepare reagents suitable for use in the present process, I will now describe the preparation of the finished reagents. As stated above, such finished reagents all include, in some proportion, an acylated polyaminoalcohol. In addition, they contain either a suitable proportion of blown fatty body or a suitable proportion of sulfonated fatty body, both prepared as already described above; or the finished reagent may contain a suitable proportion of both blown fatty body and sulfonated fatty body in addition to the amino body.

To produce my finished reagent, the acylated product of a hydroxy aminoether, obtained as stated above, is mixed with a blown fatty body or with a sulfonated fatty body, or both, of the respective kinds described above. I have found that different proportions of these three kinds of ingredients are required to be used, in the binary or ternary mixtures prepared, in order to obtain optimum results on different foaming compositions. However, I do not claim the use of any binary or ternary mixture of these three classes of ingredients, for optimum results in any foam problem.

Where binary mixtures are concerned, I have found that superior anti-foamers may be produced if the proportions of amino body and fatty body, either blown or sulfonated, lie within the limits 1:9 and 9:1. In general I prefer to employ proportions within the limits 1:4 and 4:1, in such binary mixture. If either ingredient in such binary mixture has been preliminarily diluted with some solvent before the finished mixture is prepared, such proportions of ingredients refer to active-matter proportions, exclusive of such diluents.

In all cases where ternary mixtures are concerned, and considering the active matter content of the finished mixture, exclusive of solvents, diluents, etc., as 100%, there should be present at least 10% of each of the three active ingredients. This means that in no instance can there be present more than 80% of any single ingredient in such active matter.

In addition to such active matter, the finished product may, and usually does, contain larger or smaller amounts of such inactive materials as diluents, solvents, thinners, etc.

The properties of the finished mixture are affected, not only by the proportions of the active ingredients present, but also by variations in the composition of the ingredients themselves. In some instances, the solvents, diluents, thinners, etc. may be chosen so as to contribute some additional anti-foaming properties; but obviously they should be so selected that they do not operate in a manner antagonistic toward the active ingredients above described.

The actual manufacture of the reagent of my process consists simply in making a binary or ternary mixture of the several components or ingredients described above, including, in every instance, at least the required minimum proportion of amino component. Any suitable mixing device may be employed. Usually it is convenient to dilute the reagent ingredients with a solvent of the kind hereinafter recited. It is sometimes convenient to dilute any one or each of the ingredients with a pre-determined amount of a selected solvent and to permit such solvent to remain as part of the final finished anti-foamer reagent.

Solvents generally suitable for incorporation into my reagent include: water; petroleum hydrocarbons, like gasoline, kerosene, stove oil, aromatic solvent; coal tar products, such as benzene, toluene, xylene, tar acid oil, cresol, anthracene oil; alcohols, particularly aliphatic alcohols like methyl, ethyl, isopropyl, butyl, hexyl, octyl, etc. Miscellaneous solvents, such as pine oil, carbon tetrachloride, etc., may be employed. Sometimes other factors such as whether it imparts an objectionable odor to the defoamed composition or to the products into which it finds its way will determine the choice of solvent. In general, the amounts of finished anti-foamer reagent employed are so small that considerable tolerance of undesirable properties in a solvent exists.

The mixture of active ingredients and solvents is stirred until homogeneous. I prefer to employ a petroleum distillate in the proportion of 25 to 50% of the finished product, by volume, although water is an excellent solvent in some instances.

I have demonstrated the effectiveness of my binary and tertiary mixtures over the several ingredients used separately. In some instances, the latter are quite ineffective when used alone, whereas the present reagents, representing mixtures thereof, are quite effective.

As specific examples of a number of preferred forms of my reagent, I submit the following compositions:

*Example 1*

ANTI-FOAMER

| | Pounds |
|---|---|
| Sulfonated castor oil, having ⅔ the free carboxyl group neutralized with sodium hydroxide | 23 |
| Acylated polyaminoalcohol, in which the acyl group is the ricinoleyl radical | 12 |
| Cresylic acid | 11 |
| Petroleum distillate | 23 |
| Water | 31 |

This reagent produces a milky aqueous dispersion, but is not appreciably oil-dispersible.

Example 2
ANTI-FOAMER

| | Pounds |
|---|---|
| Acylated polyaminoalcohol, in which the acyl group is the ricinoleyl radical | 24 |
| Blown castor oil | 16 |
| Petroleum distillate | 60 |

This reagent is dispersible in oil, but is not appreciably dispersible in water.

Example 3
ANTI-FOAMER

| | Pounds |
|---|---|
| Acylated polyaminoalcohol, in which the acyl group is a mixture of oleyl and rosin acid radicals | 24 |
| Blown mixed castor oil and soyabean oil (85:15) | 16 |
| Petroleum distillate | 60 |

This reagent is dispersible in oil, but is not appreciably dispersible in water.

Example 4
ANTI-FOAMER

| | Pounds |
|---|---|
| Sulfonated castor oil neutralized with ammonia to 0.5 mg./g. beyond the methyl orange end-point | 6 |
| Acylated polyaminoalcohol, in which the acyl group is the ricinoleyl radical | 18 |
| Blown castor oil | 35 |
| Petroleum distillate | 41 |

This reagent is dispersible in oil, but is not appreciably dispersible in water.

Example 5
ANTI-FOAMER

| | Pounds |
|---|---|
| Sulfonated castor oil as described in the preceding example | 4 |
| Acylated polyaminoalcohol, in which the acyl group is derived from soyabean oil | 18 |
| Blown mixed castor oil and soyabean oil (85:15) | 35 |
| Petroleum distillate | 43 |

This reagent has solubility characteristics closely resembling those of the preceding example.

Example 6
ANTI-FOAMER

| | Pounds |
|---|---|
| Acylated polyaminoalcohol, in which the acyl group is a mixture of oleyl and rosin acid radicals | 36 |
| Blown castor oil | 9 |
| Petroleum distillate | 55 |

This reagent shows some dispersibility in both oil and water.

Example 7
ANTI-FOAMER

| | Pounds |
|---|---|
| Sulfonated mixed castor oil and oleic acid (85:15), neutralized with ammonia to 0.5 mg./g. beyond the methyl orange end-point | 6 |
| Acylated polyaminoalcohol, in which the acyl group is a mixture of oleyl and rosin acid radicals | 18 |
| Blown mixed castor oil and soyabean oil (85:15) | 35 |
| Petroleum distillate | 41 |

This reagent is dispersible in oil, but is not appreciably dispersible in water.

Example 8
ANTI-FOAMER

| | Pounds |
|---|---|
| Sulfonated mixed castor oil and oleic acid (85:15), neutralized with ammonia to 0.5 mg./g. beyond the methyl orange end-point | 4 |
| Acylated polyaminoalcohol, in which the acyl group is derived from soyabean oil | 27 |
| Blown mixed castor oil and soyabean oil (85:15) | 9 |
| Petroleum distillate | 60 |

This reagent is dispersible in oil, but is not appreciably dispersible in water.

Example 9
ANTI-FOAMER

| | Pounds |
|---|---|
| Sulfonated mixed castor oil and oleic acid (85:15), having 2/3 the free carboxyl group neutralized with sodium hydroxide | 23 |
| Acylated polyaminoalcohol, in which the acyl group is a mixture of oleyl and rosin acid radicals | 12 |
| Petroleum distillates | 34 |
| Water | 31 |

This reagent produces a milky aqueous dispersion, but is not appreciably oil-dispersible.

While the foregoing detailed examples represent a number of preferred reagents suitable for use in my process, it should be clearly understood that their recitation is not intended to limit the scope of the present application. They are exemplary of the binary and ternary mixtures prepared from the three classes of material whose composition and properties have been described above in great detail.

I desire to point out that the superiority of the reagent contemplated in my process is based upon its ability to reduce or destroy foam, or to prevent foam formation, in certain foaming or potentially foaming compositions more advantageously and at lower cost than is possible with other reagents or processes. In certain instances, it has been found to destroy or reduce foams or prevent their formation, which foams were not economically or effectively reducible or preventable by any other known means.

In one application of my process, a reagent, comprising a mixture of 78 parts of sulfonated castor oil, whose free carboxyl group is approximately two-thirds neutralized with sodium hydroxide, and 22 parts of the preferred amino ingredient whose preparation is described in detail above, was added to an aqueous foaming composition in the manufacture of an alkaline hypochlorite bleaching solution. Before addition of the anti-foamer, the solution produced such a copious foam during manufacture that the latter interfered with the handling of the solution. Use of as little as 25 ml. of the above anti-foamer reagent, in the form of an approximately 50%-active solution, destroyed or reduced the head of foam on some 8,000 gallons of foaming liquid. The ratio of reagent to foaming liquid approximated 1 to 1,200,000.

In a second application of my process, the same reagent as was used in the preceding example was introduced into a foaming petroleum distillate, a foaming diesel fuel. This product had become contaminated in some manner in the refinery, to such extent that it was impossible to load it into tank trucks without having the foam come out of the filling hatch when the truck was only partially loaded. Introducing 10 gallons of the present reagent into 1,000 barrels of the diesel fuel permitted the fuel to be loaded expeditiously into said trucks, without any foaming difficulty. The ratio of reagent to foaming system here was approximately 1 to 4,000.

In a third instance, 800,000 gallons of copper ammonium acetate solution, employed in the purification of butadiene in synthetic rubber manufacture, had become so contaminated, in an unknown manner, that the gas recovery process could not be operated. The solution foamed out of the top of the tower when heat was applied to recover the respective dissolved hydrocarbon gases. In this instance, a reagent comprising 58 parts of an amino ingredient of the above-described preferred type, in which the acyl group was derived from castor oil, and 42 parts of blown castor oil was added in the form of a 40%-active solution. This action resulted in complete and immediate reduction and destruction of the foam; and the reagent served effectively to prevent its regeneration. One part of the reagent was added to 80,000 parts of copper solution.

In a fourth application of my process, a reagent comprising 58 parts of an amino ingredient similar to the above-described preferred amino ingredient, except that the acyl group was derived from a mixture of oleic and rosin acids, and 42 parts of a blown mixture of castor and soyabean oils (85% castor oil and 15% soyabean oil), was employed. The foaming system was a casein adhesive solution of the kind used to bond sheets of paper together for various purposes. When 1 part of a 40% solution of the above mixture was introduced into 1,000 parts of the foaming adhesive solution, foaming ceased; and the bonding machine was operable without recurrence of the foaming condition which had previously caused the incomplete bonding of the two sheets of paper being fed it. Use of 1 part of reagent solution to 500 and 200 parts of adhesive solution, respectively, gave results only marginally superior to the use of 1 part to 1,000. Use of less than 1 part to 1,000 gave progressively poorer protection against foaming; but the effect was still detectable when only 1 part to 15,000 was used. Pouring a small portion of the chemicalized adhesive solution into a barrel containing accumulations of foam from the bonding machine produced complete destruction of such foam within some minutes, in contrast with a normal required settling time of 24 hours or more.

In another application of my process, involving the use of ternary mixtures, the foaming system was a petroleum distillate of aromatic nature. The anti-foamer was effective when used in a concentration of 1 part to 2,000 of distillate. The composition of the reagent was as follows: 10 parts of sulfonated castor oil, neutralized to about 0.5 mg. per gram beyond the methyl orange end-point with ammonia; 25 parts of acylated amino body of the kind recited above as being the preferred type, wherein the acyl group was derived from castor oil; and 65 parts of blown castor oil. These active ingredients were employed in the form of a 55% solution in petroleum solvents.

In still another application of my process, the foaming system was as stated immediately above, an aromatic petroleum distillate. The reagent was effective when used in a concentration of 1 part to 2,000 of distillate. The reagent composition was as follows: 10 parts of sulfonated castor oil neutralized just past methyl orange with ammonia, as in the preceding example; 65 parts of a blown mixture of castor oil and soyabean oil (85% castor oil and 15% soyabean oil); and 25 parts of an acylated amino body like described in the preferred example above, except that the acyl group was derived from soyabean oil rather than from castor oil, as stated in the preferred example. The mixture was used in the form of a 40% solution in petroleum solvents.

In operating the process of my invention, one may add the anti-foaming reagent to the composition having foaming tendencies before foaming occurs, in which case the reagent operates to prevent progressive foam formation; or the reagent may be added to the foaming liquid, in which case it acts to destroy or reduce the foam already present. The reagent may be added undiluted, or diluted by water or some suitable non-aqueous solvent, such as petroleum distillates, etc. In the case of a foaming liquid, it may be most desirable to make a solution or dispersion of my reagent, and spray or sprinkle such solution or dispersion over the head of foam present. If sufficient turbulence exists in the vessel containing the foaming liquid, it may suffice merely to add the undiluted reagent to the system in one operation and at one time. In the case of foam prevention, addition of the reagent to the liquid system may be by any suitable means and injection may be continuous or intermittent, as required. A proportioning pump may be used to inject the reagent into the composition, if desired. In all cases, the proportion of my reagent required to effect foam destruction or reduction, or foam prevention, is only a very small fraction of the volume of liquid present in the foaming or potentially foaming composition.

The effectiveness of my reagent resides in part in the use of proper proportions thereof. The correct amounts to be employed may readily be determined by subjecting any desirable test volumes of the foaming, or potentially foaming, composition to accurately measured small volumes of the reagent, and observing the results of such additions, especially after shaking. Reshaking the container and contents will give the added information as to whether the anti-foamer will prevent or suppress foaming over a period of time. If the proportions of reagent to be employed are very small, it may be desirable to determine the optimum proportions of foaming liquid and anti-foamer by introducing the latter into the sample in the test container, in the form of a solution in a suitable solvent. Such procedure, which increases the accuracy of the addition, requires that a companion test be conducted using an equal volume of solvent, to prove that the effect observed is due to the anti-foamer and not to the solvent in which it was added.

Throughout this specification I have shown that my process is equally applicable to systems in which a foam is already in existence and to systems which are potentially foaming compositions, in that they have the property of producing foams when agitated or mixed with air or some other suitable gas. In the claims appended hereto I have used the word "inhibiting" to include the prevention, the destruction or reduction of foams, on the understanding that destruction, reduction and prevention are substantially identical, it being impossible to determine in the prevention process whether the reagent does, in fact, prevent the formation of the initial laminae of foam, or whether such initial laminae are destroyed by the reagent before subsequent laminae of sufficient stability to produce a foam can be superimposed thereon. By "foaming composition" in such claims, I mean a composition which is either actually foaming, or which is capable of producing a foam under suitable conditions.

In most instances, my reagent is effective to the extent that it destroys an existing foam substantially completely. In some instances, such, for example, as when the proportions of liquid and anti-foamer are quite widely removed from optimum proportions, the foam reduction may be slow, or it may even be incomplete. I intend that this description and my invention relate both to complete destruction and to partial reduction of foams.

The proportions of reagent required to be used appear, as shown by the foregoing examples, to vary widely. However, I wish to limit my invention to the use of amounts of anti-foamer comprising 1% or less of the foaming system. Usually, the amounts required will be between 0.1% and 0.0001%.

Having thus described my invention, what I claim as new and desire to secure by Letters Patent is:

1. A process for inhibiting foam, characterized by subjecting a foaming composition to the action of not more than 1% of a reagent comprising a mixture of: (A) a basic acylated polyaminoalcohol; said acylated polyaminoalcohol being a member of the class consisting of

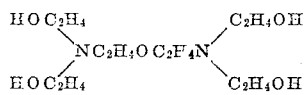

and

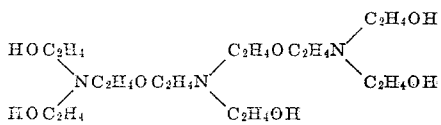

in which one hydroxyl hydrogen atom has been replaced by RCO, the acyl radical of a monocarboxy detergent-forming acid having at least 8 and not more than 32 carbon atoms; said amino compounds being selected from the class consisting of the anhydro base, the hydrated base, and salts; and (B) at least one member of the class consisting of blown fatty oils and sulfonated fatty oils, the proportions of active ingredients in any binary mixture being within the limits of 1 to 9 and 9 to 1, and the proportions of active ingredients in any ternary mixture being such that such active matter contains at least 10% of each of the three ingredients.

2. A process for inhibting foam, characterized by subjecting a foaming composition to the action of not more than 1% of a reagent comprising a mixture of: (A) a basic acylated polyaminoalcohol; said acylated polyaminoalcohol being a member of the class consisting of

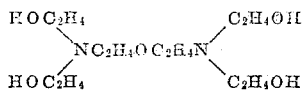

and

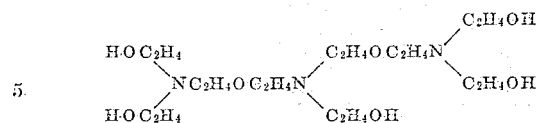

in which one hydroxyl hydrogen atom has been replaced by RCO, the acyl radical of a higher fatty acid; said amino compound being selected from the class consisting of the anhydro base, the hydrated base, and salts; and (B) at least one member of the class consisting of blown fatty oils and sulfonated fatty oils, the proportions of active ingredients in any binary mixture being within the limits of 1 to 9 and 9 to 1, and the proportions of active ingredients in any ternary mixture being such that such active matter contains at least 10% of each of the three ingredients.

3. A process for inhibiting foam, characterized by subjecting a foaming composition to the action of not more than 1% of a reagent comprising a mixture of: (A) a basic acylated polyaminoalcohol; said acylated polyaminoalcohol being a member of the class consisting of

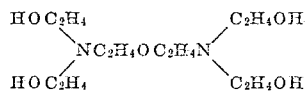

and

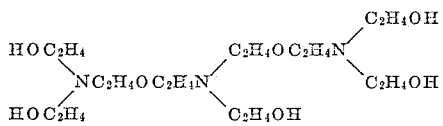

in which one hydroxyl hydrogen atom has been replaced by the ricinoleyl radical; said amino compound being selected from the class consisting of the anhydro base, the hydrated base, and salts; and (B) at least one member of the class consisting of blown castor oil and sulfonated unsaturated fatty oils, the proportions of active ingredients in any binary mixture being within the limits of 1 to 9 and 9 to 1, and the proportions of active ingredients in any ternary mixture being such that such active matter contains at least 10% of each of the three ingredients.

4. A process for inhibiting foam, characterized by subjecting a foaming composition to the action of not more than 1% of a reagent comprising a mixture of: (A) a basic acylated polyaminoalcohol; said acylated polyaminoalcohol being a member of the class consisting of

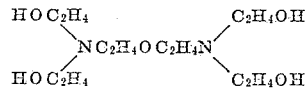

and

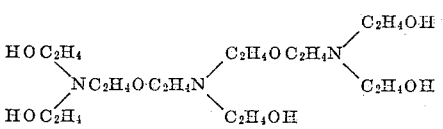

in which one hydroxyl hydrogen atom has been replaced by the ricinoleyl radical; said amino compound being selected from the class consisting of the anhydro base, the hydrated base, and salts; and (B) at least one member of the class consisting of blown castor oil and sulfonated unsaturated vegetable fatty oils, the proportions of active ingredients in any binary mixture being within the limits of 1 to 9 and 9 to 1, and the proportions of active ingredients in any ternary mixture being such that such active matter contains at least 10% of each of the three ingredients.

5. A process for inhibiting foam, characterized by subjecting a foaming composition to the action of not more than 1% of a reagent comprising a mixture of: (A) a basic acylated polyaminoalcohol; said acylated polyaminoalcohol being a member of the class consisting of

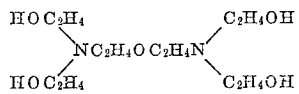

and

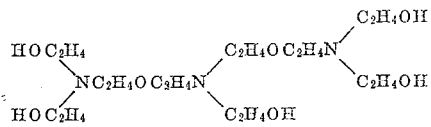

in which one hydroxyl hydrogen atom has been replaced by the ricinoleyl radical; said amino compound being selected from the class consisting of the anhydro base, the hydrated base, and salts; and (B) at least one member of the class consisting of blown castor oil and sulfonated castor oil, the proportions of the active ingredients in any binary mixture thereof being within the limits of 1:4 and 4:1, and the proportions of active ingredients in any ternary mixture being such that such active matter contains at least 10% of each of the three ingredients.

6. A process for inhibiting foam, characterized by subjecting a foaming composition to the action of not more than 1% of a reagent comprising a mixture of: (A) a basic acylated polyaminoalcohol; said acylated polyaminoalcohol being a member of the class consisting of

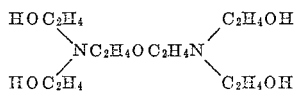

and

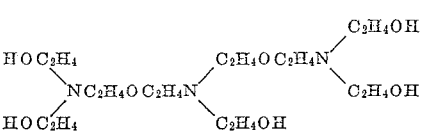

in which one hydroxyl hydrogen atom has been replaced by the ricinoleyl radical; said amino compound being selected from the class consisting of the anhydro base, the hydrated base, and salts; and (B) at least one member of the class consisting of blown castor oil and sulfonated castor oil, the proportions of the active ingredients in any binary mixture thereof being within the limits of 1:9 and 9:1, and the proportions of active ingredients in any ternary mixture being such that such active matter contains at least 10% of each of the three ingredients.

LOUIS T. MONSON.

REFERENCES CITED

The following references are of record in the file of this patent:

UNITED STATES PATENTS

| Number | Name | Date |
| --- | --- | --- |
| 2,023,755 | Weihe | Dec. 10, 1935 |
| 2,169,369 | Osterloh et al. | Aug. 15, 1939 |
| 2,285,940 | Norring | June 9, 1942 |
| 2,408,527 | Monson | Oct. 1, 1946 |
| 2,423,214 | Wells | July 1, 1947 |